United States Patent [19]

Funaki et al.

[11] 3,824,410

[45] July 16, 1974

[54] FREQUENCY TO VOLTAGE CONVERTER WITH MEANS FOR PRESCRIBING PULSE WIDTH AGAINST FLUCTUATIONS

[75] Inventors: Hidefumi Funaki; Toshiaki Tanaka; Katsuyoshi Nakajima; Yuichi Kanda, all of Tokyo, Japan

[73] Assignee: Nippon Electric Varian, Ltd., Tokyo, Japan

[22] Filed: June 20, 1972

[21] Appl. No.: 264,449

[30] Foreign Application Priority Data

June 21, 1971 Japan ................................ 46-44587

Apr. 18, 1972 Japan ................................ 47-38312

[52] U.S. Cl. .................... 307/233, 307/295, 331/18, 331/25

[51] Int. Cl. ............................................ H03k 5/00

[58] Field of Search ............ 328/140; 307/233, 295; 331/18, 25

[56] References Cited

UNITED STATES PATENTS 3,609,395 9/1971 Jania .................................. 307/233

3,723,765 3/1973 Kautz et al. ...................... 328/140 X

*Primary Examiner*—Herman Karl Saalbach

*Assistant Examiner*—Siegfried H. Grimm

*Attorney, Agent, or Firm*—Sandoe, Hopgood & Calimafde

[57] ABSTRACT

In a frequency to voltage converter, the height of pulses produced in response to the respective cycles of the input signal is stabilized by prescribing the pulse levels with reference to ground and by compensating for the temperature dependency of the characteristics of the circuit elements. Furthermore, the pulse width is prescribed by a predetermined number of cycles of a crystal controlled oscillation. A high gain feedback loop including the converter and a voltage controlled crystal oscillator serves to sweep the frequency of the voltage controlled oscillation in linear proportion to the sweep voltage applied to the loop and to phase synchronize the oscillation with respect to a reference oscillation supplied to the loop. The frequency swept oscillation is applicable to a nuclear magnetic resonance analyser without the offset oscillation.

3 Claims, 24 Drawing Figures

FREQUENCY TO VOLTAGE CONVERTER WITH MEANS FOR PRESCRIBING PULSE WIDTH AGAINST FLUCTUATIONS

BACKGROUND OF THE INVENTION

This invention relates to a frequency to voltage converter wherein use is made of a train of pulses having a prescribed pulse height and width and the repetition frequency of the input signal. The converter is applicable to a phase synchronizing loop for adjustably sweeping the frequency of the electric oscillation produced by a stable voltage controlled oscillator disposed in the loop by an adjustable sweep voltage supplied to such a loop. The sweep so effected on a high frequency sinusoidal oscillation is of prime importance to nuclear magnetic resonance analysis.

A simple variable frequency oscillator is known which comprises either a parallel or a series circuit of a crystal resonator and a variable capacity diode supplied with a control D. C. voltage for sweeping the frequency of the oscillator output. This oscillator is unsatisfactory in case an exact rectilinear relationship between the applied sweep voltage and the frequency swept thereby is indispensable.

Another conventional variable frequency oscillator device, which will later be described with reference to FIG. 1, is also objectionable in that the device is incapable of providing a stable, reproducible, and distortionless output oscillation linearly and quickly variable over a wide range of sweep.

On the other hand, a frequency to voltage converter is known, such as will hereinafter be described with reference to FIG. 2. The converter, however, has but a poor linear relationship between the frequency of the input signal and the voltage of the output signal.

SUMMARY OF THE INVENTION

It is therefore an object of the present invention to provide a frequency to voltage converter having the best possible linearity between the input frequency and the output voltage.

Another object is to provide a variable frequency oscillator device having the best possible frequency stability.

Still another object is to provide a variable frequency oscillator device having the best possible linearity between the applied sweep voltage and the output frequency swept thereby.

Yet another object is to provide a variable frequency oscillator device having the best possible reproducibility of the output frequency.

A further object is to provide a variable frequency oscillator device having a wide range of frequency sweep.

A still further object is to provide a variable frequency oscillator device whose output frequency can be swept at a high speed.

A further object is to provide a variable frequency oscillator capable of producing the purest possible sinusoidal oscillation.

A subordinate object is to provide a variable frequency oscillator for use in operating a nuclear magnetic resonance analyser without an offset oscillator.

According to the instant invention there is provided a converter for converting the frequency of an input signal to the voltage of an output signal including circuit means responsive to said input signal for deriving a train of pulses having an approximately predetermined width, wherein the improvement comprises means for prescribing said width within a tolerance of about $1 \times 10^{-3}$ times the intended width.

According to an aspect of this invention there is provided a converter of the type described, wherein said pulse width prescribing means comprises first means for prescribing the levels of said pulses with reference to the ground of a power source for said circuit means and second means for compensating for the temperature dependency of the characteristics of said circuit means.

According to another aspect of this invention there is provided a converter of the type described above, wherein said pulse width prescribing means comprises a crystal oscillator for producing a sharply rising oscillation and means for starting said oscillation when said input signal assumes a predetermined level and stopping said oscillation when a predetermined number of cycles of said oscillation have occurred.

According to still another aspect of this invention there is provided an adjustable variable frequency oscillator comprising a voltage controlled stable oscillator, a high gain negative feedback loop therefor, a reference frequency oscillator, and a source for producing an adjustable sweep voltage, said loop in turn comprising a frequency converter responsive to the outputs of said voltage controlled and said reference frequency oscillators for producing a signal of the frequency determined by the frequencies of the last-mentioned outputs, a frequency to voltage converter of the type described for producing in response to the last-mentioned signal an output signal of the voltage determined by the last-mentioned frequency, and means responsive to the last-mentioned voltage and said sweep voltage for controlling the frequency of the output of said voltage controlled oscillator.

BRIEF DESCRIPTION OF THE DRAWINGS

For a more detailed understanding of the invention, reference may be made to the description below taken in conjunction with the drawings wherein.

Figures 7A, 7B, 7C, 7D, 7E, 7F, 7G, 7H, 7I:
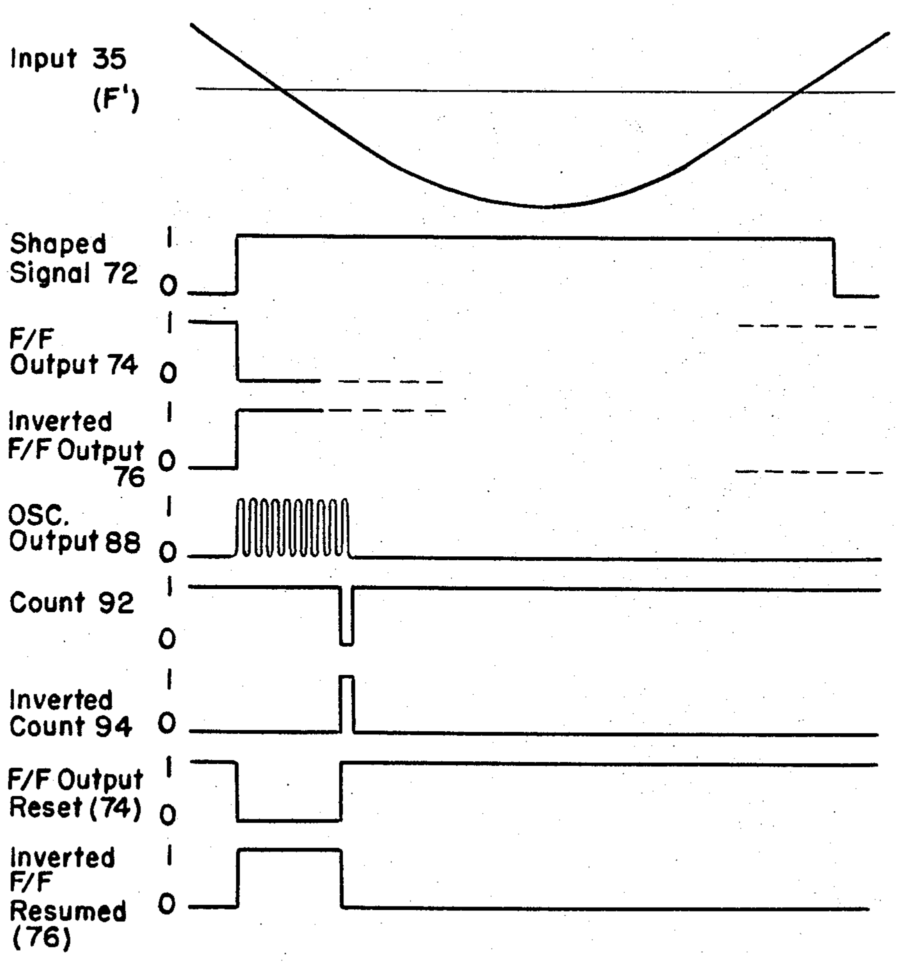
Figure 2:
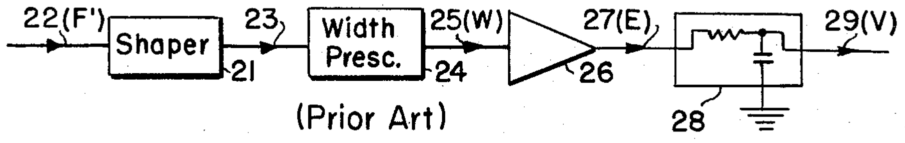
FIG. 2 is a block diagram of a conventional frequency-to-voltage converter.
Figure 4:
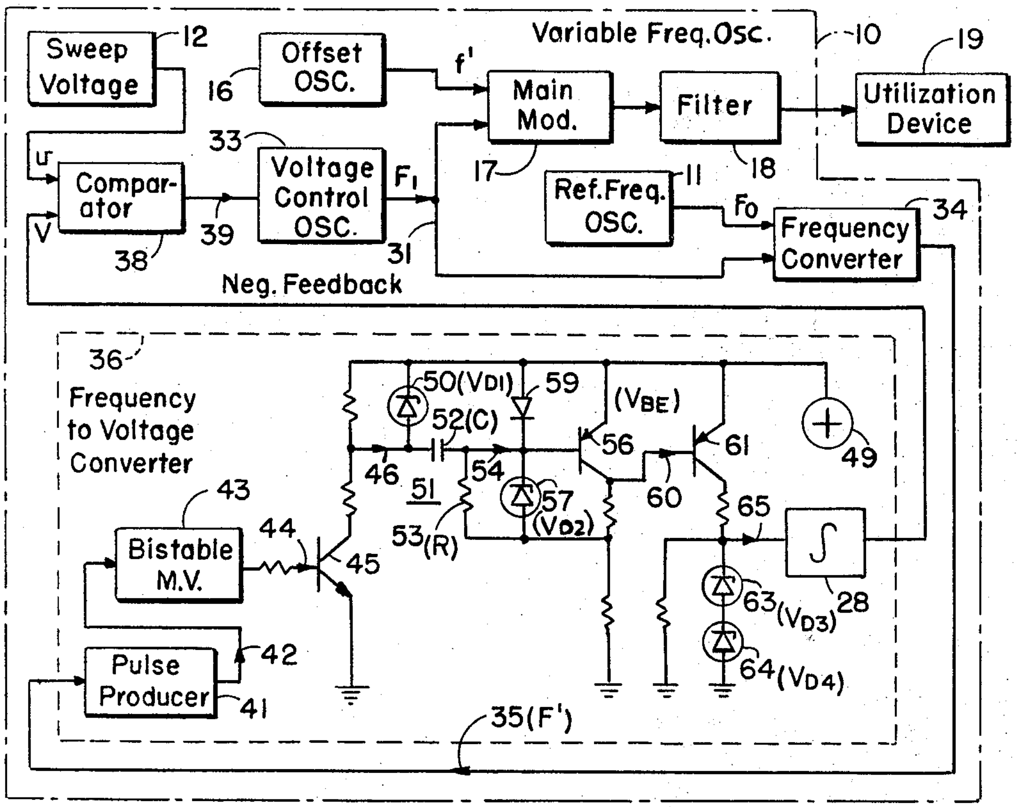
Figure 5A:
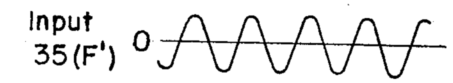
Figure 5B:
Figure 5C:
Figure 5D:
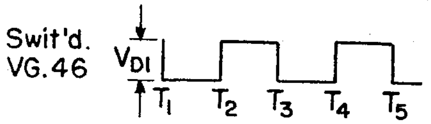
Figure 5E:
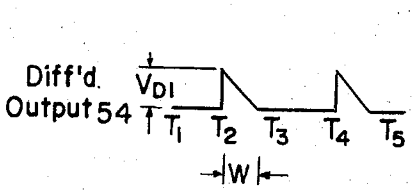
Figure 5F:
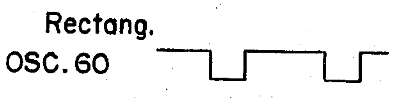
Figure 5G:
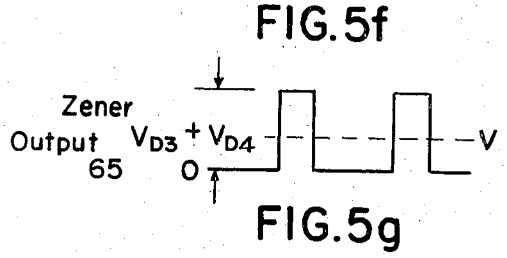
Figure 6:
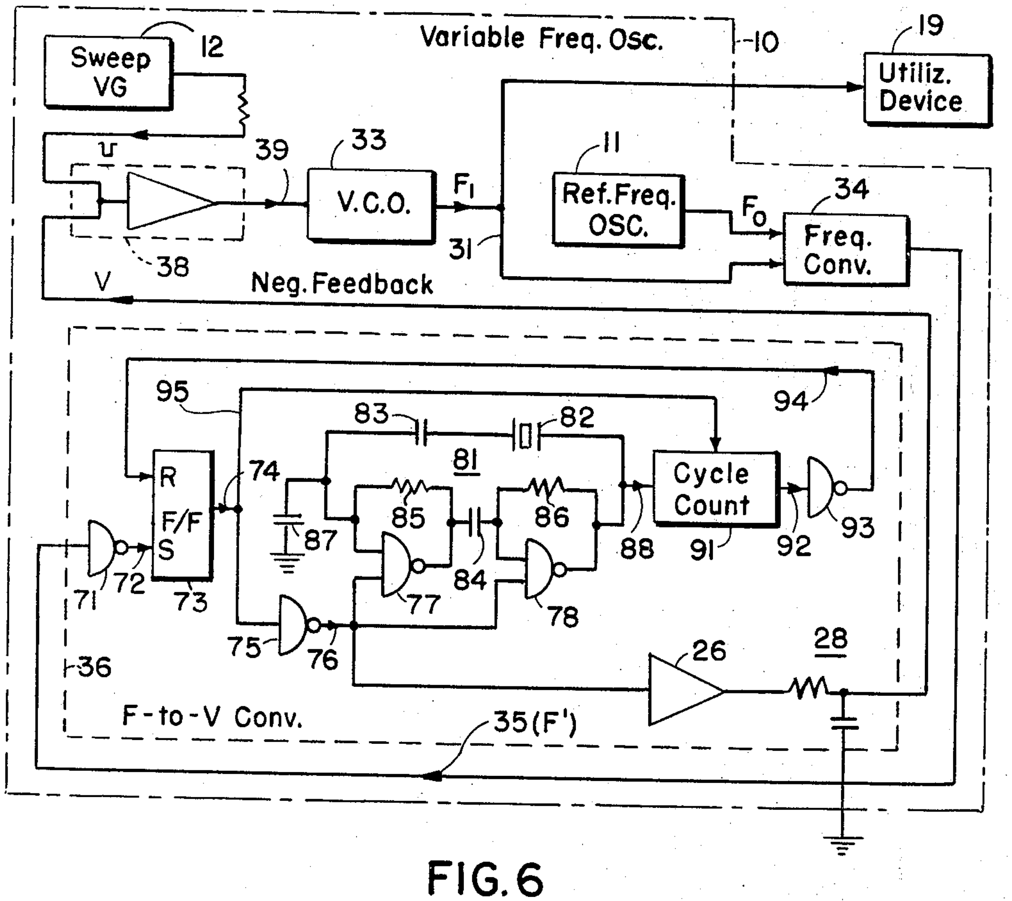

FIG. **3*a* shows the wave form of a signal supplied to the converter illustrated in FIG. 2**;

FIG. **3*b*** shows the wave form of the output signal of a shaper used in the converter;

FIG. **3*c*** shows the width prescribed signal produced by a pulse width prescriber used in the converter;

FIG. **3*d*** shows the height prescribed signal produced by an amplifier used in the converter;

FIG. 4 is a schematic circuit diagram of a variable frequency oscillator including a first embodiment of the present invention;

FIGS. **5*a* through 5*g*** show wave forms appearing at various points in the first embodiment;

FIG. 6 is a schematic circuit diagram of a variable frequency oscillator including a second embodiment of this invention;

FIG. **7*a* shows the wave form of a signal supplied to the second embodiment of this invention used in the variable frequency oscillator illustrated in FIG. 6**;

FIG. 7*b* shows the wave form of the signal produced by an input NAND gate used in the second embodiment;

FIG. 7*c* shows the wave form of the output signal of a flip-flop circuit responsive to the signal illustrated in FIG. 7b;

FIG. 7*d* shows the wave form obtained by inversion of the signal depicted in FIG. 7*c;*

FIG. 7*e* shows the wave form of the oscillation produced by an oscillator used in the second embodiment;

FIG. 7*f* shows the wave form of the signal produced by a cycle counter for counting the cycles of the oscillation;

FIG. 7*g* shows the wave form derived by inversion of the signal illustrated in FIG. 7*f;*

FIG. 7*h* shows the wave form of the output signal illustrated in FIG. 7*c* as the flip-flop circuit is reset by the signal depicted in FIG. 7*g;* and FIG. 7*i* shows the wave form obtained by inversion of the signal illustrated in FIG. 7*h.*

DESCRIPTION OF THE PREFERRED EMBODIMENTS

Figure 1:
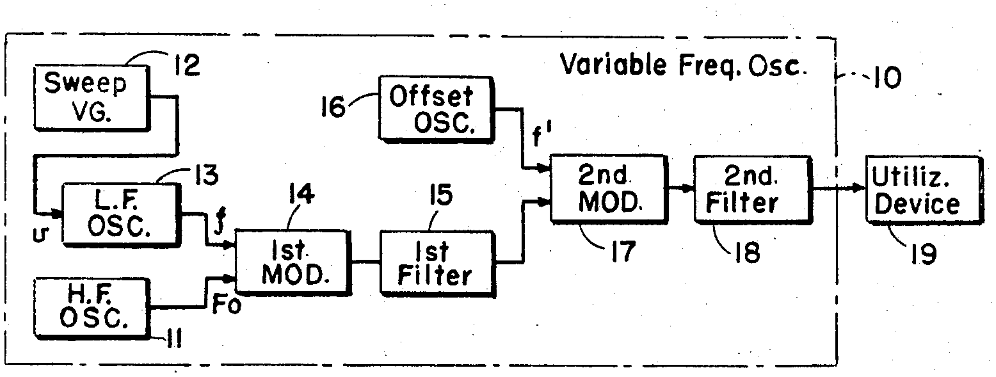
(Prior Art) FIG. 1
FIG. 1 is a block diagram of a conventional variable frequency oscillator.

Referring to FIG. 1, a conventional variable frequency oscillator mentioned in the preamble of this specification and used in a frequency sweeper device 10 for a nuclear magnetic resonance analyser will now be described in some detail in order to facilitate the understanding of the present invention. The frequency sweeper device comprises a high frequency oscillator 11 for generating an electric oscillation of a frequency $F_0$ and a sweep voltage source 12 for producing an adjustable sweep D. C. voltage $v$. The frequency $F_0$ may be 15 MHz. The sweep voltage source 12 may be a potentiometer coupled with the X-axis drive for the recorder of the analyser. The device further comprises a low frequency oscillator 13 controlled by the sweep voltage $v$ for producing an electric oscillation of a varying frequency $f$, a first modulator 14 supplied with the high and the varying frequency oscillations for delivering a first modulation output having an upper side band component of the frequency $F_0 + f$ and a lower side band component of the frequency $F_0 - f$. The modulator 14 is preferably a balanced modulator. The device still further comprises a first filter 15 having a pass band for the desired side band component. The varying frequency $f$ is of the order of 5kHz. It is therefore necessary that the filter 15 be capable of sufficiently attenuating the unwanted side band component which is spaced apart from the desired side band by only 10 kHz. It is further desirable that the filter 15 have a wide pass band width to provide a wide range of sweep. These requirements for the filter 15 are somewhat contradictory, with the result that it is difficult for the filter 15 to derive the desired single side band component to provide a purest possible sinusoidal oscillation as required by the nuclear magnetic resonance analysis. The purity might be raised if the frequency difference between the side band components were stressed by raising the varying frequency $f$. This naturally widens the range of the frequency sweep but deteriorates the stability of the varying frequency $f$.

Referring further to FIG. 1, the frequency sweeper 10 still further comprises an offset oscillator 16 for generating an electric oscillation of a relatively low frequency $f^1$, a second modulator 17 supplied with the outputs of the first filter 15 and the offset oscillator 16 for delivering a second modulation output again having upper and the lower side band components, and a second filter 18 having a pass band which includes the preferred component. Inasmuch as the output of the first filter 15 includes the unwanted components and consequently has frequencies $F_0$, $F_0 + f$, and $F_0 - f$, the second modulation output has frequencies $F_0 \pm f^1$, $F_0 + f \pm f^1$, and $F_0 - f \pm f^1$. The off-set frequency $f^1$ should be adjustable over a range of approximately 30 kHz in view of the possible range of the chemical shifts of various atomic nuclei. Accordingly, the second filter 18 should have a pass band width of about 30 kHz, which covers the frequencies of at least three components of the second modulation output under the present circumstances where it is necessary to use a sweep frequency $f$ of the order of 5kHz. It is therefore unavoidable that the high frequency oscillation obtained from the second filter 18 having unwanted frequency components is supplied to a utilization device 19 in the analyser. In addition, the third order distortion inevitably resulting from the second modulator 17 further deteriorates the purity of the high frequency oscillation. This brings about beats and other problems in the nuclear magnetic resonance.

Figures 3A, 3B, 3C, 3D:
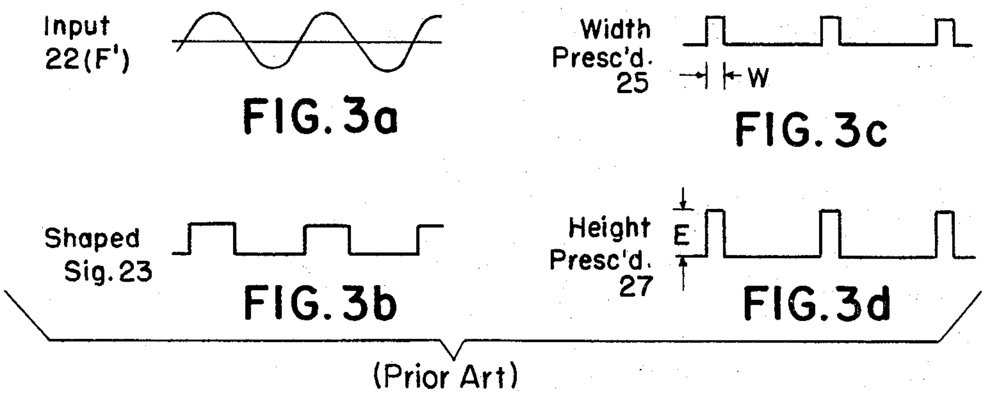
FIG. 3a, FIG. 3b, FIG. 3c, FIG. 3d (Prior Art)

Referring to FIGS. 2 and 3, a conventional frequency-to-voltage converter referred to in the preamble will be described for convenience in describing the instant invention. The converter comprises a shaper 21 supplied with an input signal 22 having a frequency $F^1$ for producing a shaped rectangular signal 23. FIGS. 3*a* and *b* illustrate, by way of example, the input signal 22 as a sinusoidal oscillation and the shaped rectangular signal 23, respectively. The frequency $F^1$ may either be a high frequency or a relatively low frequency. The converter further comprises a pulse width prescribing circuit 24 often comprising a differentiation circuit and a monostable multivibrator for deriving a train 25 of pulses having an approximately constant pulse width $W$ depicted in FIG. 3*c*, an amplifier 26 for amplifying the pulse train 25 to another train 27 of pulses of a predetermined height $E$ shown in FIG. 3 *d*, and an integrator 28 for integrating the amplified pulse train 27 to derive an output signal 29 whose level $V$ is approximately linearly proportional to the input frequency $F^1$. More particularly, the output voltage $V$ is given by $$V = [\int_W E\,dt]/T = EW/T = F^1EW, \quad (1)$$

where $T$ represents the period of the input signal 22, while the output voltage $V$ is sufficiently smaller than the pulse voltage $E$. If the input frequency $F^1$ remains unchanged, the output voltage $V$ is dependent on the pulse width $W$ and the pulse height $E$. The conventional converter has but a poor linearity between the input frequency $F^1$ and the output voltage $V$ because of the fluctuations in the pulse width and height.

Referring to FIG. 4, a frequency sweeper device 10 for a nuclear magnetic resonance analyser including a frequency-to-voltage converter of a first embodiment of the present invention comprises a high frequency oscillator 11, a sweep voltage source 12, and an offset oscillator 16, all similar to the corresponding circuit components illustrated in FIG. 1. The device further comprises a main modulator 17 and a filter 18 and is accompanied by a utilization device 19, which are the equivalents of the second modulator and filter 17 and 18 and the utilization device 19, respectively. Preferably, the high frequency oscillator 11 is a crystal oscillator for generating a stable electric oscillation of the reference frequency $F_0$. The device still further comprises a negative feedback loop 31 which in turn comprises a voltage controlled crystal oscillator 33 for producing an electric oscillation of the varying high frequency $F_1$, a frequency converter 34, such as a balanced modulator, supplied with the oscillations of the reference and the varying frequencies $F_0$ and $F_1$ for deriving the modulation output 35, a frequency to voltage converter 36 for converting the frequency $F^1$ (which is equal to $F_0 - F_1$ in this case) of the modulation output 35 to a feedback D. C. voltage $V$ of the polarity opposite to the adjustable sweep D. C. voltage $v$, and a comparator 38 having a D. C. amplifier and supplied with the sweep and the feedback voltages $v$ and $V$ for producing an error signal 39 representative of that difference between such D. C. voltages which is always urged towards zero. When the absolute value of the feedback voltage $V$ is equal to that of a given sweep voltage $v$, the varying frequency $F_1$ is kept unchanged by the loop 31, whereas a change $\Delta F_1$, if produced for one reason or other, will result in a change $\Delta V$ of the feedback voltage $V$ as given by Equation 1:

$$\Delta V = E \cdot W \cdot \Delta (F_0 - F_1) = E \cdot W \cdot \Delta F_1$$

for producing a corresponding error signal 39, which acts on the voltage controlled oscillator 33 to restore the original varying frequency $F_1$. When the sweep voltage $v$ varies by an amount $\Delta v$, a corresponding error signal 39 is produced to change the varying frequency $F_1$ by a corresponding amount $\Delta F_1$ given by:

$$\Delta v = E \cdot W \cdot \Delta F_1,$$

thereby returning the error to zero. The varying frequency $F_1$ is thus linearly controlled by the sweep voltage $v$. It is to be noted here that the frequency $F^1$ of the signal 35 supplied to the frequency-to-voltage converter 36 is significantly lower than the reference and varying frequencies $F_0$ and $F_1$, with the result that it is easy to separate the various components of the modulation output 35 by frequency. The difference frequency $F^1$ may be about 5 kHz ~ 10 kHz.

Further referring to FIG. 4, the oscillation of the varying frequency $F_1$ is directly led to the main modulator 17. This obviates the distortion which would otherwise be introduced into the oscillation by nonlinear circuit components, such as the first modulator 14. If the frequency to voltage converter 36 is stable enough and if the loop 31 has a sufficiently high gain, the varying frequency oscillation produced by the voltage controlled oscillator 33 is substantially phase synchronized with the reference oscillation generated by the high frequency oscillator 11. As a result, the negative feedback loop 31 may be looked upon as a phase synchronizing loop. This assures the purity and the stability of the varying frequency oscillation. If the frequency-to-voltage conversion is sufficiently linear, the high gain makes it additionally possible to improve the linearity between the variation in the sweep voltage $v$ and the variation in the varying frequency $F_1$ to a level satisfactory for magnetic resonance analysis. More particularly, a loop gain of $\beta$ restricts the deviation from the exact rectilinearity to $1/\beta$. For example, a gain of 1,000 is sufficient, which limits the deviation to about 0.1 percent. A higher gain is of no practical use because this linearity is comparable with the present day precision of the sweep voltage $v$. The stability of the output oscillation and the linearity between the sweep voltage $v$ and the varying frequency $F_1$ results in a high reproducibility for the varying frequency $F_1$.

Referring still further to FIG. 4 and additionally to FIG. 5, a frequency-to-voltage converter 36, which may be used for various purposes other than magnetic resonance analysis, comprises a pulse producer 41 supplied with an input signal 35 of a frequency $F^1$ depicted in FIG. *5a* for producing a train 42 of pulses shown in FIG. *5b*, a bistable multivibrator 43 responsive to the train 42 for producing a shaped rectangular oscillation 44 shown in FIG. *5c*, and an NPN switching transistor 45 supplied with the rectangular oscillation 44. Depending upon the intended use of the frequency to voltage converter 36, the input frequency $F^1$ may either be high or low. In addition, the input signal 35 need not be sinusoidal. In order to provide an output D. C. voltage $V$ which has the best possible linear relationship with the input frequency $F^1$, a rectangular voltage 46 developed at the collector of the transistor 45 should be devoid of effects attributable to the temperature dependency of the saturation level of the transistor 45, the fluctuation of the voltage supplied from a power source 49, and other causes. According to this invention, a first Zener diode 50 is interposed together with a resistor between the collector and the power source 49 so that the Zener voltage $V_{D1}$ prescribes the voltage of the switched rectangular voltage 46, which is supplied to a differentiation circuit 51 including a capacitor 52 and a resistor 53. Again, the effects of the fluctuation of the source voltage should be excluded from the differentiated output 54. Further according to this invention, this exclusion is achieved by leading the differentiated output 54 to a PNP transistor 56 ordinarily operable at the saturation level, with the emitter connected to a power source 49. In this manner, the electric potentials on both sides of the capacitor 52 are linked with the potential provided by the power source 49 so as not to vary relative to the latter potential, however the latter may fluctuate. Furthermore, a second Zener diode 57 is connected across the resistor 53 to link the voltage appearing thereacross with the source potential.

Further referring to FIGS. 4 and 5, the switched rectangular voltage 46 and the differentiated output 54 thus assume the wave form illustrated in FIGS. *5d* and *e*, respectively. The low input impedance of the base of the PNP transistor 56 additionally serves to deprive the differentiated output 54 of the negative going pulses which would otherwise appear, occurring at times $T_1$, $T_3$, and so on shown in FIGS. *5d* and *e*. The pulse width $W$ of the differentiated output 54 is given by $$W = R \cdot C \cdot \ln(1 + V_{D1}/V_{D2}^1), \quad (2)$$

where RC is the time constant of the differentiation circuit 51 and the quantity $V_{D2}^1$ is given by $$V_{D2}^1 = V_{D2} - V_{BE},$$

where in turn $V_{D2}$ is the Zener voltage of the second Zener diode 57 and $V_{BE}$ is the base-emitter voltage of the PNP transistor 56. Among the variables in the right side of Equation (2), the Zener voltages $V_{D1}$ and $V_{D2}$ are not variable with the source voltage. The capacity $C$ and the resistance $R$ are also free from fluctuations because capacitors and resistors having excellent temperature characteristics are readily obtained. The base-emitter voltage $V_{BE}$, however, is subject to a temperature dependency of about 2.5mV/°C. It is therefore necessary in order to make the temperature dependency of the pulse width $W$ negligible that the second Zener voltage $V_{D2}$ be considerably larger than the base-emitter voltage $V_{BE}$. More particularly, let the ratio $V_{BE}/V_{D2}$ be represented by $x$. The rate $\Delta x$ of change of quantity $V_{D2}^{1}$ is given by $$\Delta x = \Delta V_{BE}/V_{D2}^{1} \approx \Delta V_{BE}/V_{D2} = 2.5 \times 10^{-3}/V_{D2}\ (°C^{-1}).$$

On the other hand, the pulse width $W$ given by Equation (2) is now given by $$W = R \cdot C \cdot 1n[1 + (1-x)^{-1} \cdot V_{D1}/V_{D2}] = R \cdot C \cdot 1n[1 + (1 + x + x^2 + \ldots) \cdot V_{D1}/V_{D2}] \approx R \cdot C \cdot 1n[(1 + V_{D1}/V_{D2}) \cdot (1 + (1 + V_{D1}/V_{D2})^{-1} \cdot (V_{D1}/V_{D2}) \cdot x] \approx R \cdot C \cdot 1n(1 + V_{D1}/V_{D2}) + R \cdot C \cdot (1 + V_{D1}/V_{D2})^{-1} \cdot (V_{D1}/V_{D2}) \cdot x,$$

with the result that the temperature dependency and the rate thereof are given by $$\Delta W = R \cdot C \cdot (1 + V_{D1}/V_{D2})^{-1} \cdot (V_{D1}/V_{D2}) \cdot \Delta V_{BE}/V_{D2}$$

and $$\Delta W/W = [(V_{D1} + V_{D2}) \cdot 1n(1 + V_{D1}/V_{D2})]^{-1} \cdot (V_{D1}/V_{D2}) \cdot \Delta V_{BE},$$

respectively. When both Zener voltages $V_{D1}$ and $V_{D2}$ are about 10 V, the rate $\Delta W/W$ is approximately equal to $2 \times 10^{-4}\ °C^{-1}$, which is as small as the temperature dependency of the Zener voltage. This rate, however, is still too large because it gives a rate of 1 Hz/°C to the input frequency $F^1$ of the order of 5kHz. It is therefore further necessary that a silicon diode 59 be interposed in the forward direction between the second Zener diode 57 and the power source 49 to compensate for temperature dependency.

As described in detail hereinabove, it has been found that the circuitry including the differentiation circuit 51 makes an important improvement in the linearity of the frequency to voltage conversion characteristic. The first embodiment has improved the linearity by providing a voltage prescribing means in the circuitry for making the voltage appearing therein depend on the potential of the power source 49 and for compensating for the temperature dependency of the characteristics of the circuit elements in the frequency to voltage converter 36. As is known in the art, the collector of the PNP transistor 56 provides a rectangular oscillation 60 illustrated in FIG. 5*f*, which is led to a third transistor 61 whose collector output should now be prescribed with reference to ground for the power source 49. This is achieved by another voltage prescribing means comprising a third and a fourth Zener diode 63 and 64. The collector voltage 65 derived from the third transistor 61 thus assumes a wave form depicted in FIG. 5*g*, the mean D. C. level giving the output D. C. voltage $V$ shown therein by a broken line. The output voltage $V$ is thus prescribed by the invariable pulse width $W$ and the last-mentioned voltage prescribing means 63 and 64 so as to be very stable for a given input frequency $F^1$ and to vary in the best possible linear relationship to the input frequency $F^1$.

Referring to FIGS. 6 and 7, a frequency sweeper device 10 with a frequency-to-voltage converter of a second embodiment of the instant invention comprises a reference frequency oscillator 11, a sweep voltage source 12, an accompanying utilization device 19, an amplifier 26, an integrator 28, a voltage controlled crystal oscillator 33, a frequency converter 34, a frequency-to-voltage converter 36, and a comparator 38, all being equivalents of the respective circuit members illustrated in FIGS. 2 and 4. The frequency to voltage converter 36 comprises a first NAND gate 71 supplied with the modulation output 35 of the frequency $F^1$ a half cycle of which is depicted in FIG. 7*a* for producing a shaped rectangular signal 72 shown in FIG. 7*b*, a flip-flop 73 put in the reset state in the manner later described and set by the shaped rectangular signal 72 to turn the flip-flop output signal 74 into the logic "0" state illustrated in FIG. 7*c*, a second NAND gate 75 for producing an inverted signal 76 shown in FIG. 7*d*, and a third NAND gate 77 supplied with the inverted signal 76 at one of its two input terminals, and a fourth two-input NAND gate 78 similarly supplied with the inverted signal 76. The converter 36 further comprises a crystal oscillator 81 which in turn comprises the third and the fourth NAND gates 77 and 78, a crystal resonator 82, coupling capacitors 83 and 84, feedback resistors 85 and 86 shunting the other input terminals and the output terminals of the respective two-input NAND gates 77 and 78, and another capacitor 87 for adjusting the positive feedback for the crystal resonator 82. While the inverted signal 76 is in the logic "1" state, the crystal oscillator 81 generates an electric oscillation 88 of the characteristic frequency of the crystal resonator 82. It is possible by proper selection of the circuit constants to make the oscillation 88 rise sharply in the manner illustrated in FIG. 7*e*. The converter 36 still further comprises a cycle counter 91 responsive to the oscillation 88 for producing a logic "0" pulse 92 depicted in FIG. 7*f* each time the cycles of the oscillation 88 reaches a predetermined number such as, for example, 10 and a fifth NAND gate 93 responsive to the pulse 92 for supplying an inverted pulse 94 shown in FIG. 7*g* to the flip-flop circuit 73 to reset the same in the manner depicted in FIG. 7*h*, thereby stopping the oscillation 88 and resetting the cycle counter 91 through a connection 95 and the output signal 76 of the second NAND gate 75 to logic "0" as shown in FIG. 7*i*. This operation repeats for every cycle of the modulation output 35, with the result that the circuitry described above comprises in effect an oscillator 81 and a frequency demultiplier therefor. The frequency demultiplied output 76 is a train of pulses corresponding to the train 25 shown in FIG. 3*c* and having such a prescribed width $W$ which is determined by the number of cycles counted by the cycle counter 91 and is as stable as the characteristic frequency of the crystal oscillator 81.

With the second embodiment of this invention, to which various modifications are possible, the pulse width $W$ is prescribed with the precision of the crystal oscillator 81. This provides not only the best possible linearity between the input frequency $F^1$ and the output voltage $V$ but also the best possible stability and reproducibility of the varying frequency $F_1$. As another unexpected result, it is possible to select a considerably higher frequency $F^1$ for the modulation output 35, thereby permitting a wide range of the frequency sweep and a high sweep speed. With 15 MHz selected for the reference frequency $F_0$, the range of the best possible linear sweep may be as wide as 100 kHz or even more. With a sweep range of 100 kHz and with a given sweep voltage $v$, the variable frequency $F_1$ does not vary beyond 0.1 Hz for a considerable duration of time. Ths same parameters apply to the first embodiment. Consequently, the present invention makes it possible to provide a frequency sweeper for a nuclear magnetic resonance analyser having no offset oscillator 16, no main modulator 17, and no filter 18, avoiding the unwanted frequency components and the undesirable distortion.

The circuits described above are exemplary and susceptible of variation and modification without departing from the spirit or scope of the invention. Therefore, the invention is not deemed to be limited to the particular embodiments that have been described in detail.

What is claimed is:

1. A frequency-to-voltage converter for producing an output signal having a voltage corresponding to the frequency of an input signal comprising:

first means for receiving said input signal and producing a first pulse train in accordance with the frequency thereof;

a line for connection to a direct current power supply, and a load connected to said line to provide a voltage drop;

second means connected to said first means to receive said first pulse train and connected to said load to receive said direct current for producing a second pulse train having an approximately predetermined width;

third means for prescribing the amplitude of said second pulse train with reference to the voltage level of said direct current, said third means comprising a Zener diode connected to said power supply line in parallel with said load;

differentiation circuit means connected to said third means to receive said amplitude prescribed second pulse train for producing a differential output;

fourth means for insulating the converter from the effects of temperature variations comprising a silicon diode interconnected between said power supply lines and said differentiation circuit means; and integrator means connected to said differentiation circuit means for integrating the output thereof.

2. A converter according to claim 1, further comprising fifth means for prescribing the amplitude of said differential output with reference to a ground to insulate said differential output from variations in the voltage of said direct current power supply.

3. A converter according to claim 1, wherein:

said differentiation circuit means comprises a resistor and a capacitor, said capacitor having a first electrode connected to said load and a second electrode connected to said resistor; and said fifth means further comprises an additional Zener diode connected across said resistor.

* * * * *